(12) United States Patent
Dousse et al.

(10) Patent No.: US 11,493,346 B2
(45) Date of Patent: Nov. 8, 2022

(54) APPARATUS AND ASSOCIATED METHODS FOR DETERMINING THE LOCATION OF A VEHICLE

(71) Applicant: HERE GLOBAL B.V., Eindhoven (NL)

(72) Inventors: Olivier Dousse, Berlin (DE); Andrii Martyniv, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 267 days.

(21) Appl. No.: 16/470,892

(22) PCT Filed: Dec. 20, 2017

(86) PCT No.: PCT/EP2017/083855
§ 371 (c)(1),
(2) Date: Jun. 18, 2019

(87) PCT Pub. No.: WO2018/115142
PCT Pub. Date: Jun. 28, 2018

(65) Prior Publication Data
US 2020/0088526 A1 Mar. 19, 2020

(30) Foreign Application Priority Data
Dec. 20, 2016 (EP) ..................... 16205344

(51) Int. Cl.
*G01C 21/30* (2006.01)
(52) U.S. Cl.
CPC .................... *G01C 21/30* (2013.01)
(58) Field of Classification Search
CPC .... G01C 21/30; G01C 21/3484; G01C 21/28; G01C 7/02; G01C 21/26
See application file for complete search history.

(56) References Cited

U.S. PATENT DOCUMENTS

| 5,311,173 A | 5/1994 | Komura et al. |
| 5,488,559 A * | 1/1996 | Seymour ............... G01C 21/30 342/357.31 |

(Continued)

FOREIGN PATENT DOCUMENTS

| EP | 1039266 A1 | 9/2000 |
| EP | 2045577 A1 | 4/2009 |

(Continued)

OTHER PUBLICATIONS

Davidson et al., "Application of Particle Filters for Vehicle Positioning Using Road Maps", 23rd International Technical Meeting of the Satellite Division of The Institute of Navigation, Jan. 2010, retrieved from https://pdfs.semanticscholar.org/9a24/19632b72d3c91c4b27598f3d1856728556e4.pdf, pp. 1653-1661.

(Continued)

*Primary Examiner* — Bhavesh V Amin
(74) *Attorney, Agent, or Firm* — Ditthavong, Steiner & Mlotkowski

(57) ABSTRACT

An apparatus comprising a processor and memory including computer program code, the memory and computer program code configured to, with the processor, enable the apparatus at least to:
  determine a current location of a vehicle on a road network comprising a plurality of different paths of travel using respective recursive Bayesian filters for each of the different paths of travel,
  wherein each recursive Bayesian filter is configured to compare data received from a sensor on the vehicle with predetermined map data for the respective path of travel to calculate a likelihood of the vehicle being currently located on the respective path of travel and a probability distribution of possible locations along this path of travel.

20 Claims, 4 Drawing Sheets

(56) References Cited

U.S. PATENT DOCUMENTS

| | | | | |
|---|---|---|---|---|
| 5,923,286 | A * | 7/1999 | Divakaruni | G01S 19/49 342/357.44 |
| 5,999,126 | A * | 12/1999 | Ito | G01S 19/48 342/465 |
| 6,356,836 | B1 * | 3/2002 | Adolph | G08G 1/096827 701/410 |
| 6,856,898 | B1 * | 2/2005 | Tompkins | G01C 21/30 701/428 |
| 6,941,220 | B2 * | 9/2005 | Le | G01C 21/3629 342/357.31 |
| 6,975,939 | B2 * | 12/2005 | Edwards | G01C 21/26 701/493 |
| 7,855,683 | B2 * | 12/2010 | Razoumov | G01S 19/48 342/458 |
| 8,041,472 | B2 * | 10/2011 | Kobori | G09B 29/106 701/472 |
| 8,046,169 | B2 * | 10/2011 | Mazlum | G01S 19/50 701/472 |
| 8,214,149 | B2 * | 7/2012 | Lee | G01S 19/50 701/533 |
| 8,305,264 | B1 * | 11/2012 | Jones | G01S 19/46 342/357.55 |
| 8,374,784 | B2 * | 2/2013 | Mazlum | G01S 19/50 701/472 |
| 8,401,787 | B2 * | 3/2013 | Kang | G01C 21/3658 701/472 |
| 8,416,129 | B2 * | 4/2013 | Martens | G01S 19/38 342/357.21 |
| 8,718,932 | B1 * | 5/2014 | Pack | G01C 21/30 701/446 |
| 8,725,412 | B2 * | 5/2014 | Kobori | G08G 1/09623 701/446 |
| 9,157,749 | B2 * | 10/2015 | Aoki | G01C 21/30 |
| 9,226,111 | B2 * | 12/2015 | Marti | H04W 4/029 |
| 9,429,437 | B2 * | 8/2016 | MacGougan | G01C 21/30 |
| 9,746,331 | B1 * | 8/2017 | Yu | G01S 19/48 |
| 9,933,527 | B2 * | 4/2018 | MacGougan | G01C 21/30 |
| 10,018,474 | B2 * | 7/2018 | Li | G01C 21/30 |
| 10,281,279 | B2 * | 5/2019 | Ahmed | G01C 21/18 |
| 10,955,556 | B2 * | 3/2021 | MacGougan | G01S 19/26 |
| 11,054,264 | B2 * | 7/2021 | Koponen | G01C 21/30 |
| 2002/0128768 | A1 * | 9/2002 | Nakano | G01C 21/3626 701/533 |
| 2006/0212217 | A1 * | 9/2006 | Sheha | G01C 21/367 340/995.23 |
| 2007/0216540 | A1 * | 9/2007 | Riley | G08G 1/096883 342/357.29 |
| 2008/0228395 | A1 * | 9/2008 | Kobori | G01C 21/30 701/8 |
| 2008/0319596 | A1 * | 12/2008 | Yamada | G01C 21/3469 701/22 |
| 2009/0149201 | A1 * | 6/2009 | Ryu | G01S 5/0263 455/456.6 |
| 2009/0174600 | A1 * | 7/2009 | Mazlum | G01S 19/50 342/357.58 |
| 2009/0248301 | A1 * | 10/2009 | Judd | G01C 21/206 701/466 |
| 2009/0271108 | A1 * | 10/2009 | Kobori | G01C 21/30 701/532 |
| 2010/0019963 | A1 * | 1/2010 | Gao | G01S 5/0027 342/357.31 |
| 2010/0039316 | A1 * | 2/2010 | Gronemeyer | G01S 19/34 342/357.66 |
| 2010/0138148 | A1 * | 6/2010 | Nishibashi | G01C 21/3476 701/533 |
| 2010/0312472 | A1 * | 12/2010 | Hilbrandie | G01C 21/32 701/533 |
| 2011/0071755 | A1 * | 3/2011 | Ishigami | G01S 19/22 701/478.5 |
| 2011/0313648 | A1 * | 12/2011 | Newson | G01C 21/3484 701/447 |
| 2012/0022781 | A1 * | 1/2012 | Wilson | G01C 21/3469 701/410 |
| 2012/0052872 | A1 * | 3/2012 | Do | G01S 5/18 455/456.1 |
| 2013/0346423 | A1 * | 12/2013 | MacGougan | G01C 21/30 707/748 |
| 2014/0035782 | A1 * | 2/2014 | Fischer | G01S 19/252 342/357.43 |
| 2014/0062777 | A1 * | 3/2014 | MacGougan | G01S 19/07 342/357.43 |
| 2014/0266905 | A1 * | 9/2014 | Sendonaris | G01S 1/04 342/385 |
| 2015/0142248 | A1 * | 5/2015 | Han | G01C 21/3602 701/23 |
| 2015/0300827 | A1 | 10/2015 | Malalur et al. | |
| 2015/0319729 | A1 * | 11/2015 | MacGougan | G01S 19/28 455/456.1 |
| 2016/0069690 | A1 * | 3/2016 | Li | G01S 19/49 701/411 |
| 2016/0238714 | A1 * | 8/2016 | Pyke | G01C 21/165 |
| 2017/0176191 | A1 * | 6/2017 | Li | G01S 19/01 |
| 2017/0219359 | A1 * | 8/2017 | Elhoushi | G01C 21/206 |
| 2017/0356744 | A1 * | 12/2017 | Klipp | G01C 21/206 |
| 2018/0224285 | A1 * | 8/2018 | Stajner | G01C 21/32 |
| 2020/0034624 | A1 * | 1/2020 | Sharma | G06F 3/011 |

FOREIGN PATENT DOCUMENTS

| | | |
|---|---|---|
| WO | 2002039063 A1 | 5/2002 |
| WO | 2018115142 A1 | 6/2018 |

OTHER PUBLICATIONS

Lamb et al., "Avoiding Explicit Map-matching in Vehicle Location", 1999, retrieved from http://users.cecs.anu.edu.au/~thiebaux/papers/its99.doc, pp. 1-9.

Written Opinion of The International Searching Authority and International Search Report for related International Patent Application No. PCT/EP2017/083855, dated Mar. 22, 2018, 10 pages.

Sarkka, "Bayesian Filtering and Smoothing", Sep. 5, 2013, retrieved from https://users.aalto.fi/~ssarkka/pub/cup_book_online_20131111.pdf, 252 pages.

Office Action for related European Patent Application No. 16205344.1-1001, dated Jun. 17, 2020, 7 pages.

Office Action for related European Patent Application No. 16205344.1-1002, dated Feb. 25, 2021, 5 pages.

* cited by examiner

APPARATUS AND ASSOCIATED METHODS FOR DETERMINING THE LOCATION OF A VEHICLE

CROSS-REFERENCES TO RELATED APPLICATIONS

This application claims priority from a PCT Application Serial No. PCT/EP2017/083855, filed on Dec. 20, 2017, which claims priority from a European Application Serial No. 16205344.1, filed on Dec. 20, 2016, the contents of which are hereby incorporated herein in their entirety by this reference.

TECHNICAL FIELD

The present disclosure relates to the field of route navigation, associated methods and apparatus, and in particular concerns an apparatus configured to determine a current location of a vehicle on a road network comprising a plurality of different paths of travel using respective recursive Bayesian filters for each of the different paths of travel. Certain disclosed example aspects/embodiments relate to portable or in-vehicle navigation devices. An in-vehicle navigation device may comprise hardware with similar characteristics to that of a mobile navigation device, but usually comprises less powerful hardware designed for the task. In the present case, the portable or in-vehicle navigation device should have access to a database containing map data (either online or offline) and sensor data from one or more sensors (e.g. GNSS, inertial measurement unit, accelerometer, compass, magnetometer, gyroscope, barometer/altitude sensor, camera, LiDAR, RADAR, ultrasound sensor and the like).

BACKGROUND

Research is currently being done to develop improved navigation devices which can provide a user with more detailed and accurate information about road networks to further aid route navigation.

One or more aspects/embodiments of the present disclosure may or may not address this issue.

The listing or discussion of a prior-published document or any background in this specification should not necessarily be taken as an acknowledgment that the document or background is part of the state of the art or is common general knowledge.

SUMMARY

According to a first aspect, there is provided an apparatus comprising a processor and memory including computer program code, the memory and computer program code configured to, with the processor, enable the apparatus at least to:
 determine a current location of a vehicle on a road network comprising a plurality of different paths of travel using respective recursive Bayesian filters for each of the different paths of travel,
 wherein each recursive Bayesian filter is configured to compare data received from a sensor on the vehicle with predetermined map data for the respective path of travel to calculate a likelihood of the vehicle being currently located on the respective path of travel and a probability distribution of possible locations along this path of travel.

The apparatus may be configured to determine the plurality of different paths of travel.

The apparatus may be configured to map-match at least one known location of the vehicle with the predetermined map data to determine the plurality of different paths of travel.

The apparatus may be configured to extend a path of travel based on the predetermined map data when the current location of the vehicle is determined to be proximal to the end of the path of travel.

The apparatus may be configured to determine one or more additional paths of travel in the event that the likelihoods associated with each of the different paths of travel indicate that none of these paths of travel sufficiently fit the sensor data.

The apparatus may be configured to determine the current location of the vehicle at least partially by excluding any paths of travel having an associated likelihood below a predefined threshold.

The apparatus may be configured to determine the current location of the vehicle at least partially by excluding any path of travel in which the ratio of its associated likelihood to that of the most likely path of travel is below a predefined threshold.

The apparatus may be configured to determine the current location of the vehicle at least partially by excluding all but a predefined number of paths of travel having the highest associated likelihoods whilst retaining any paths of travel having an associated likelihood equal to the lowest of the remaining paths of travel.

The apparatus may be configured to determine the current location of the vehicle as one or more of the possible locations along the path of travel having the greatest associated likelihood (e.g. the "expected value" of the distribution).

Each recursive Bayesian filter may be a Kalman filter configured to produce a Gaussian distribution of possible locations along the respective path of travel, and the apparatus may be configured to determine the current location of the vehicle as the centre of the Gaussian distribution associated with the path of travel having the greatest associated likelihood.

The apparatus may be configured to normalize the likelihoods calculated by the recursive Bayesian filters to obtain a probability distribution of the possible paths of travel.

Each recursive Bayesian filter may be configured to compare the sensor and predetermined map data to include one or more additional physical state variables in the probability distribution.

The one or more additional physical state variables may comprise at least one of speed, heading, angular velocity, odometer scaling factor and gyroscope calibration parameters.

The paths of travel may be unidirectional, and the apparatus may be configured to, in the event that the heading of the vehicle differs by more than 90° relative to the direction of a particular path of travel, add an identical path of travel extending in the opposite direction.

Each recursive Bayesian filter may be configured to compare real-time sensor data with the predetermined map data.

The apparatus may be configured to store the sensor data after it has been received, and each recursive Bayesian filter may be configured to compare the stored sensor data with the predetermined map data.

The sensor on the vehicle may be one or more of a global or regional navigation satellite system receiver (e.g. for NAVSTAR GPS, GLONASS, BeiDou, Galileo, GAGAN or IRNSS), an inertial sensor, a camera, an accelerometer and a gyroscope.

The plurality of different paths of travel may be two-dimensional or three-dimensional paths of travel.

The apparatus may be one or more of an electronic device, a portable electronic device, a portable telecommunications device, a mobile phone, a personal digital assistant, a tablet, a phablet, a desktop computer, a laptop computer, a server, a smartphone, a smartwatch, smart eyewear, a portable satellite navigation device, an in-vehicle satellite navigation device, and a module for one or more of the same.

According to a further aspect, there is provided a method comprising:

determining a current location of a vehicle on a road network comprising a plurality of different paths of travel using respective recursive Bayesian filters for each of the different paths of travel, wherein each recursive Bayesian filter is configured to compare data received from a sensor on the vehicle with predetermined map data for the respective path of travel to calculate a likelihood of the vehicle being currently located on the respective path of travel and a probability distribution of possible locations along this path of travel.

The steps of any method disclosed herein do not have to be performed in the exact order disclosed, unless explicitly stated or understood by the skilled person.

Corresponding computer programs (which may or may not be recorded on a carrier) for implementing one or more of the methods disclosed herein are also within the present disclosure and encompassed by one or more of the described example embodiments.

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:—

FIG. 2b illustrates schematically three different paths of travel on the road network of FIG. 2a;

FIG. 3b illustrates schematically a probability distribution of possible locations further along the particular path of travel of FIG. 3a;

DESCRIPTION OF SPECIFIC ASPECTS/EMBODIMENTS

Navigation devices need to be able to determine the current location of a vehicle relative to a map in order to provide route guidance to the driver of the vehicle. This is typically achieved using one or more on-board sensors, such as a global navigation satellite system (GNSS), an inertial sensor, a camera, an accelerometer and a gyroscope. The state-of-the-art solution to this problem comprises multiple separate steps. First of all, dead reckoning (which typically combines a known reference position (e.g. from GNSS) with sensor data (e.g. from an inertial sensor)) is used to determine a trajectory and extrapolate this trajectory when no satellite signals are available (e.g. in tunnels). Next, map-matching is performed to associate the determined trajectory with the most likely path of travel on the road network. As there are often explicable shifts between the determined trajectory and the most likely path of travel (e.g. due to atmospheric conditions or reflections affecting the GNSS signals, or drifting of the dead reckoning), the map-matched position is then fed back to the dead reckoning unit so that it can be used to correct errors in the trajectory. Finally, if a lane assistance system is available, then this is used to keep track of which lane the vehicle is currently on. This module takes as an input the number of available lanes on the current road and tracks lane crossings, which allows the lateral position of the vehicle on the road to be tracked.

One issue with this approach is that some regions of the road network comprise adjacent roads which are indistinguishable from one another based on the data from certain on-board sensors. For example, there are instances where the GNSS signal indicates that a vehicle is travelling along a motorway when in actual fact it is on a single carriageway which runs parallel to that particular section of the motorway (or vice-versa). In this scenario, the road guidance provided by the navigation device does not match the current path of travel, which is unhelpful for the driver and potentially dangerous for both the driver and other road users (especially given that different classes of road typically have different speed limits).

There will now be described an apparatus and associated methods that may address this issue.

Figure 1:
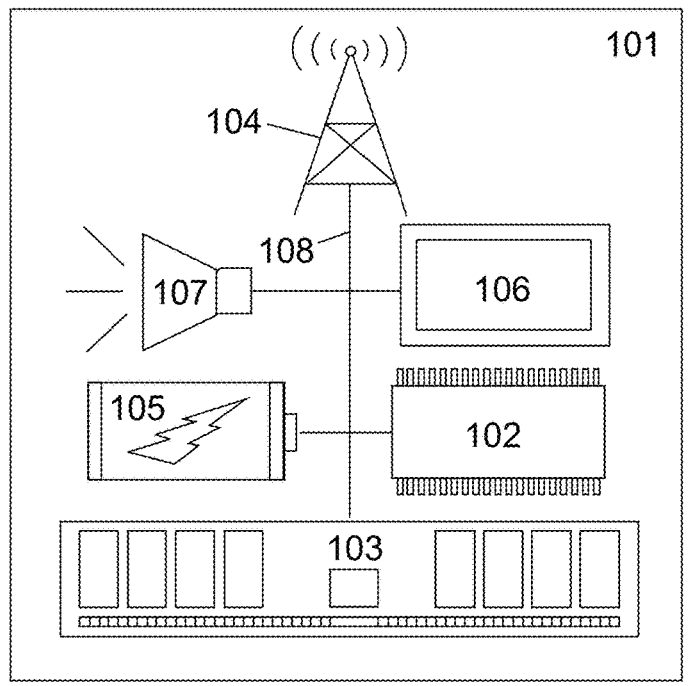
FIG. 1 illustrates schematically an apparatus configured to perform one or more methods described herein.

FIG. 1 shows an apparatus 101 configured to perform one or more methods described herein. The apparatus 101 may be at least one of an electronic device, a portable electronic device, a portable telecommunications device, a mobile phone, a personal digital assistant, a tablet, a phablet, a desktop computer, a laptop computer, a server, a smartphone, a smartwatch, smart eyewear, a portable satellite navigation device, an in-vehicle satellite navigation device, and a module for one or more of the same.

In this example, the apparatus 101 comprises a processor 102, a memory 103, a transceiver 104, a power supply 105, an electronic display 106 and a loudspeaker 107, which are electrically connected to one another by a data bus 108. The processor 102 is configured for general operation of the apparatus 101 by providing signalling to, and receiving signalling from, the other components to manage their operation. The memory 103 is configured to store computer program code configured to perform, control or enable operation of the apparatus 101. The memory 103 may also be configured to store settings for the other components. The processor 102 may access the memory 103 to retrieve the component settings in order to manage the operation of the other components. The processor 102 may be a microprocessor, including an Application Specific Integrated Circuit (ASIC). The memory 103 may be a temporary storage medium such as a volatile random access memory. On the other hand, the memory 103 may be a permanent storage medium such as a hard disk drive, a flash memory, or a non-volatile random access memory.

The transceiver 104 is configured to transmit data to, and/or receive data from, other apparatus/devices, whilst the power supply 105 is configured to provide the other components with electrical power to enable their functionality, and may comprise one or more of a mains adapter, a battery, a capacitor, a supercapacitor, and a battery-capacitor hybrid. The electronic display 106 may be an LED, LCD or plasma display, and is configured to display visual content which is stored on (e.g. on the storage medium) or received by (e.g. via the transceiver) the apparatus 101. Similarly, the loudspeaker 107 is configured to output audio content which is stored on or received by the apparatus 101. The visual and audio content may comprise related components of a combined audio visual content. In some examples, the audio and/or visual content may comprise navigational content (such as geographical information and directions, distances, speeds or times of travel).

The method described herein departs from the above-mentioned approach of fusing multiple sensor inputs to derive a location which is subsequently map-matched. Instead, the assumption that the vehicle is driving on the road network is utilised to derive a plurality of different paths of travel (or "road rails") representing the possibilities that the vehicle has to traverse the road network. A path of travel in this context consists of a drivable sequence of contiguous road segments in two or three dimensions reflecting the trajectory of the vehicle so far. The present apparatus may be configured to determine the plurality of different paths of travel by map-matching at least one known location of the vehicle with the predetermined map data. This involves finding a list of road segments near the known location and, for each road segment, creating a path of travel comprising that road segment. If the road segment can be travelled in both directions, two paths of travel may be created which extend in opposite directions from each end of the road segment.

Figure 2A:
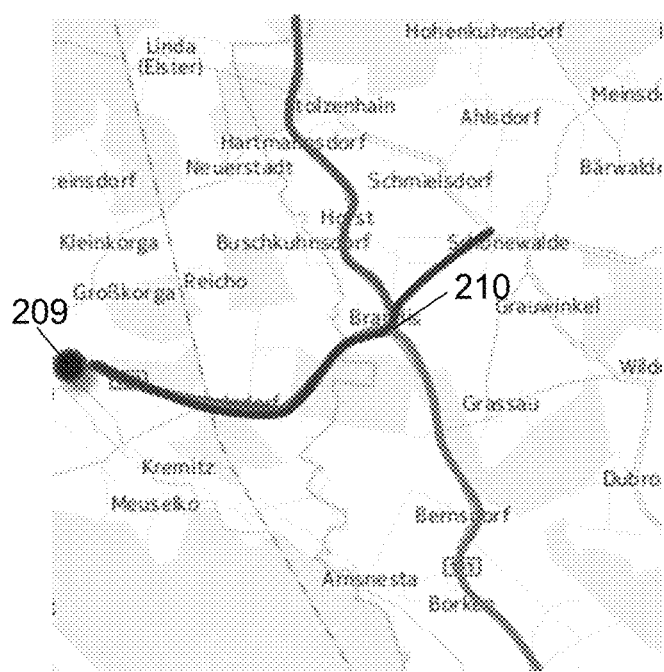
FIG. 2a illustrates schematically one example of a road network.
Figure 2B:
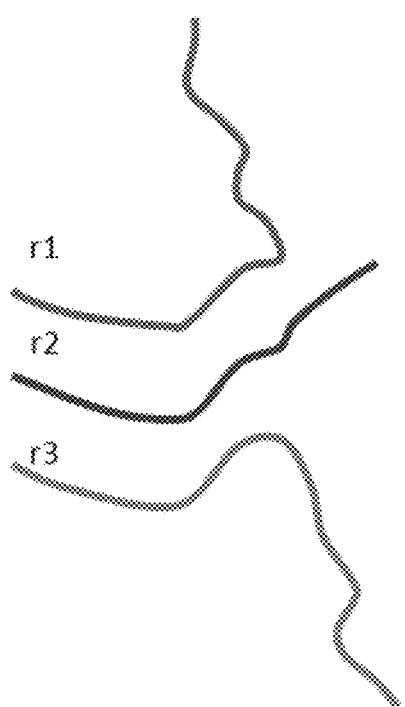

FIGS. 2a and 2b show a map of a road network indicating an initial location 209 of the vehicle (not necessarily the current location) and three possible paths of travel r1-r3 through the road network as determined by the apparatus. As can be seen, the three different paths of travel r1-r3 intersect at a common point 210 on the road network, which may be a roundabout or a crossroad etc.

Once the plurality of different paths of travel r1-r3 have been determined, the apparatus is configured to compare data received from a sensor (or a plurality of sensors) on the vehicle with predetermined map data (e.g. a digital map, street level and aerial imagery, road coordinates, speed limits, road restrictions, etc) for each path of travel r1-r3 using respective recursive Bayesian filters. For example, the sensor may be a global navigation satellite system receiver, and the apparatus may be configured to compare geographical coordinates from the satellite data with the stored coordinates of a digital map. Similarly, the sensor may be a camera, and the apparatus may be configured to compare images recorded by the camera with stored street level images taken at various locations on the road network. The latter scenario may be particularly useful for detecting lanes or exits on a stretch of road.

Each recursive Bayesian filter calculates a likelihood of the vehicle being currently located on the respective path of travel r1-r3, and a probability distribution of possible locations along this path of travel r1-r3. The likelihood is therefore a measure of how well the respective path of travel r1-r3 fits the sensor data. In some cases, however, the likelihoods associated with each of the different paths of travel r1-r3 may indicate that none of these paths of travel r1-r3 sufficiently fit the sensor data (e.g. because the likelihoods are below a predefined threshold). In this scenario, the apparatus may be configured to determine one or more additional paths of travel. This may be achieved by map-matching (as described above), or by considering other paths of travel in proximity to the existing paths of travel. In some cases, none of the additional paths of travel may fit the sensor data either, which could indicate an error in the map data. This can be addressed by obtaining the most up-to-date map data for the road intersection.

Although the recursive Bayesian filters would typically be configured to compare real-time sensor data with the predetermined map data to enable the current location of the vehicle to be determined, they may use sensor data from a previous part of the vehicle trajectory (e.g. which has been stored by the apparatus) to predict the current location. This enables the present method to be used for recursive Bayesian smoothing in addition to or instead of recursive Bayesian filtering.

This process is repeated iteratively to ensure that the current location of the vehicle is up-to-date (e.g. in predefined time steps or whenever new sensor data becomes available). The current location of the vehicle can then be determined by taking the likelihood and probability distribution of each recursive Bayesian filter into account. For example, the apparatus may be configured to determine the current location of the vehicle as one or more of the possible locations along the path of travel having the greatest associated likelihood.

Figure 3A:
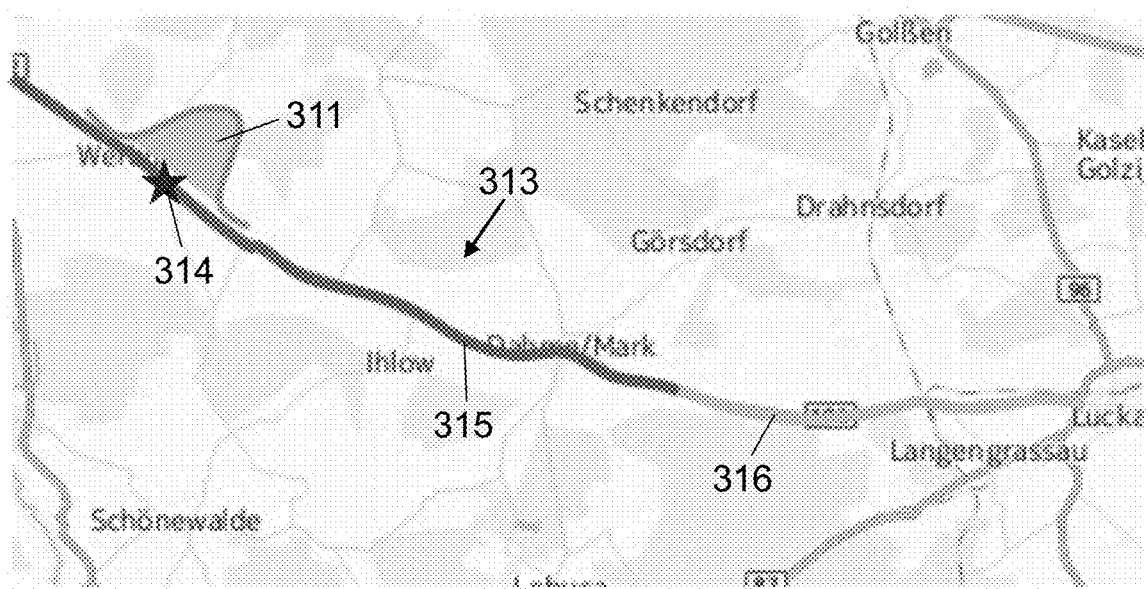
FIG. 3a illustrates schematically a probability distribution of possible locations along a particular path of travel.
Figure 3B:
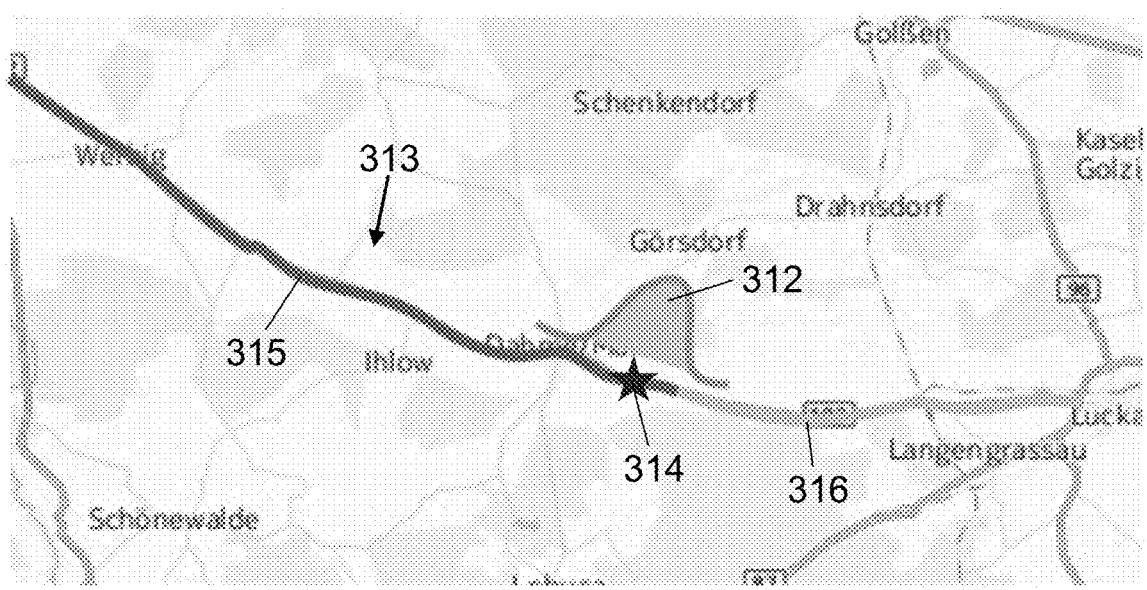

FIGS. 3a and 3b show the probability distributions 311, 312 calculated at two different points on the path of travel 313 having the greatest associated likelihood. In this example, each recursive Bayesian filter is a Kalman filter (although it could another type of filter such as an Unscented Kalman filter) configured to produce a Gaussian distribution of possible locations along the respective path of travel 313, and the apparatus is configured to determine the current location of the vehicle as the centre of the Gaussian distribution (as indicated by the star 314). It should be noted, that as the determined vehicle location approaches the end of the current road segment 315, the filter may require additional information about the path of travel 313 in order to function. In this scenario, the apparatus is configured to extend the path of travel 313 based on the predetermined map data when the current location of the vehicle is determined to be proximal to the end of the path of travel 313 (i.e. map data is obtained for the next road segment 316 as the vehicle approaches the end of the current road segment 315).

Figure 4A:
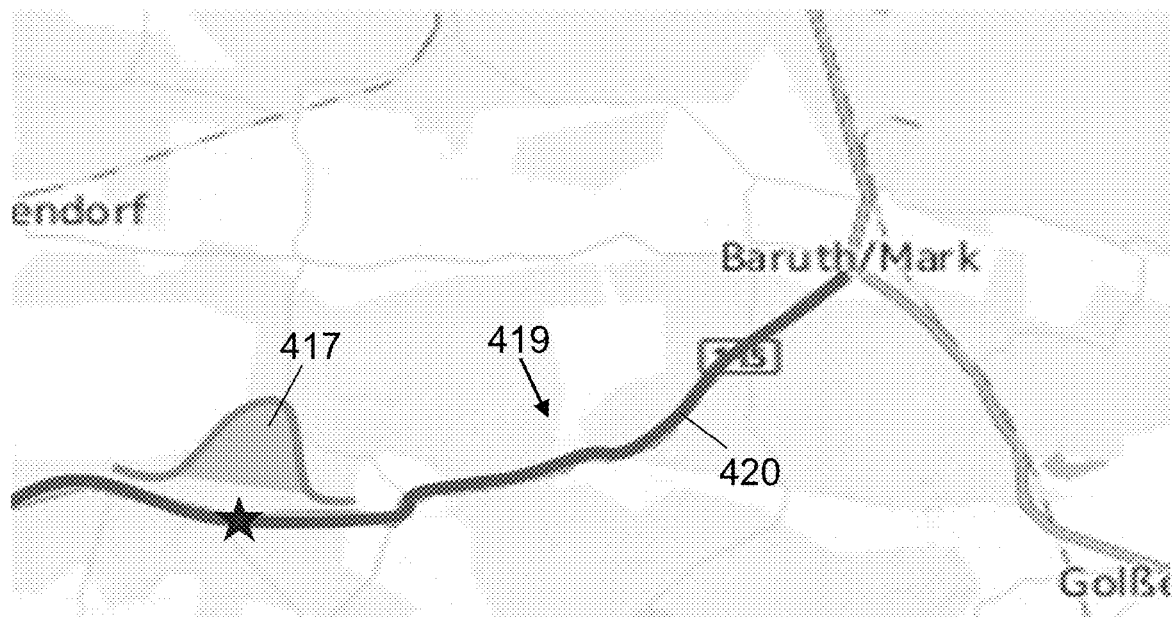
FIG. 4a illustrates schematically a probability distribution of possible locations on a path of travel with no drivable deviations.
Figure 4B:
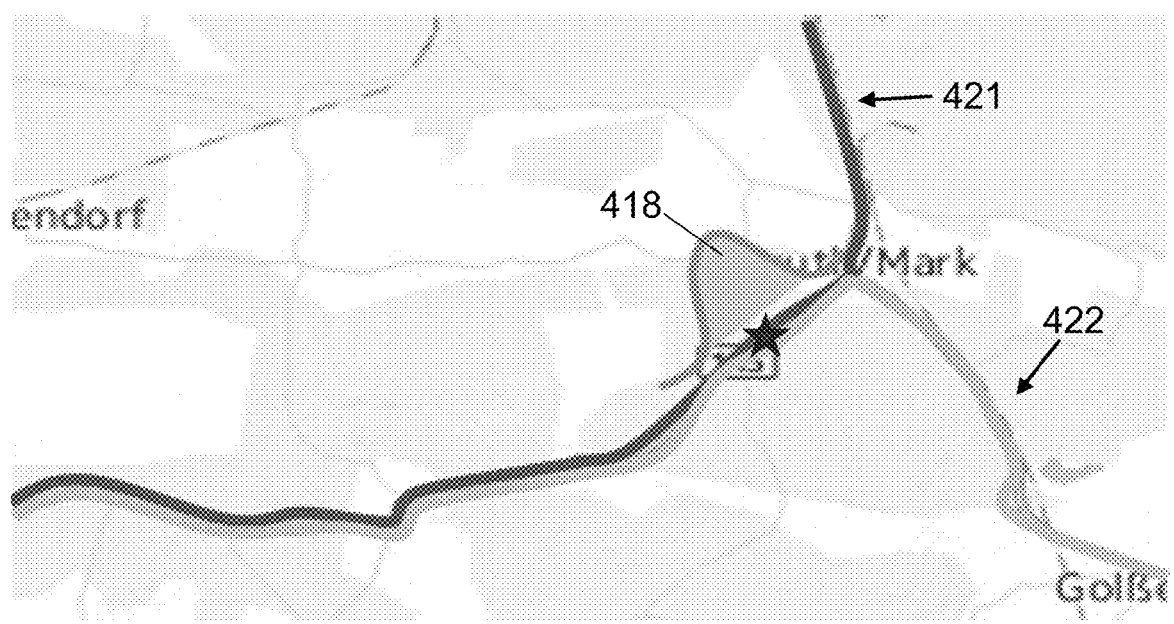
FIG. 4b illustrates schematically a probability distribution of possible locations at a road intersection.

FIGS. 4a and 4b show the probability distributions 417, 418 calculated at two different points on another path of travel 419 having the greatest associated likelihood (i.e. a separate vehicle trajectory to the one shown in FIGS. 3a and 3b). In FIG. 4a, the path of travel 419 is relatively straight with no drivable deviations (as per FIGS. 3a and 3b). As the vehicle approaches the end of the current road section 420, however, the road diverges in different directions thereby creating two different possible paths of travel 421, 422. The apparatus therefore considers the likelihood of each path of travel 421, 422 separately using a respective Bayesian filter in order to track the vehicle location.

As the vehicle continues along the driver's chosen trajectory, more sensor data is obtained and one path of travel 421 accumulates a significantly greater likelihood than the other path of travel 422. It can therefore be concluded with confidence that the driver is not following the less likely path 422. As a consequence, the less likely path of travel 422 and its associated filter can be discarded from the analysis. In this way, the increase in the number of paths at an intersection is compensated for when the less likely paths 422 are excluded. This keeps the amount of data to be processed at a manageable level. In practice, the apparatus may be configured to exclude any paths of travel having an associated likelihood below a predefined threshold; exclude any path of travel in which the ratio of its associated likelihood to that of the most likely path of travel is below a predefined threshold; or exclude all but a predefined number of paths of travel having the highest associated likelihoods whilst retaining any paths of travel having an associated likelihood equal to the lowest of the remaining paths of travel.

In some examples, the apparatus may be configured to determine a probability distribution over all possible paths of travel rather than a plurality of respective likelihoods. This can be achieved by normalising the likelihoods. If the different paths of travel have likelihoods $l_1, l_2, \ldots, l_n$, then the probability distribution is defined by the individual probability $p_i$ of each path i, where:

$$p_i = \frac{l_i}{\sum_{j=1}^{n} l_j} \quad \text{Equation 1}$$

In addition to location, each recursive Bayesian filter may be configured to compare the sensor and predetermined map data to include one or more additional physical state variables in the probability distribution depending on what sensor and map data are available. For example, the additional physical state variables may comprise at least one of speed, heading, angular velocity, odometer scaling factor and gyroscope calibration parameters. In this way, the present apparatus can determine not only the current location of the vehicle, but also its speed and direction, etc. When the recursive Bayesian filter takes account of multiple physical state variables it outputs a joint distribution of all variables, but this can then be marginalised to obtain the probability distribution for one particular variable if required. For instance, if the state contains three physical variables x, y and z, the marginal distribution of x can be obtained using:

$$P(x) = \iint P(x,y,z) \, dy \, dz \quad \text{Equation 2}$$

The additional variables can also be used in the Bayesian filter to determine the most likely path of travel (e.g. because different paths of travel may have different associated shapes and speed limits). One such example is when the heading of the vehicle differs by more than 90° relative to the direction of a particular path of travel. In this scenario, the apparatus may be configured to add an identical path of travel extending in the opposite direction.

Figure 5:
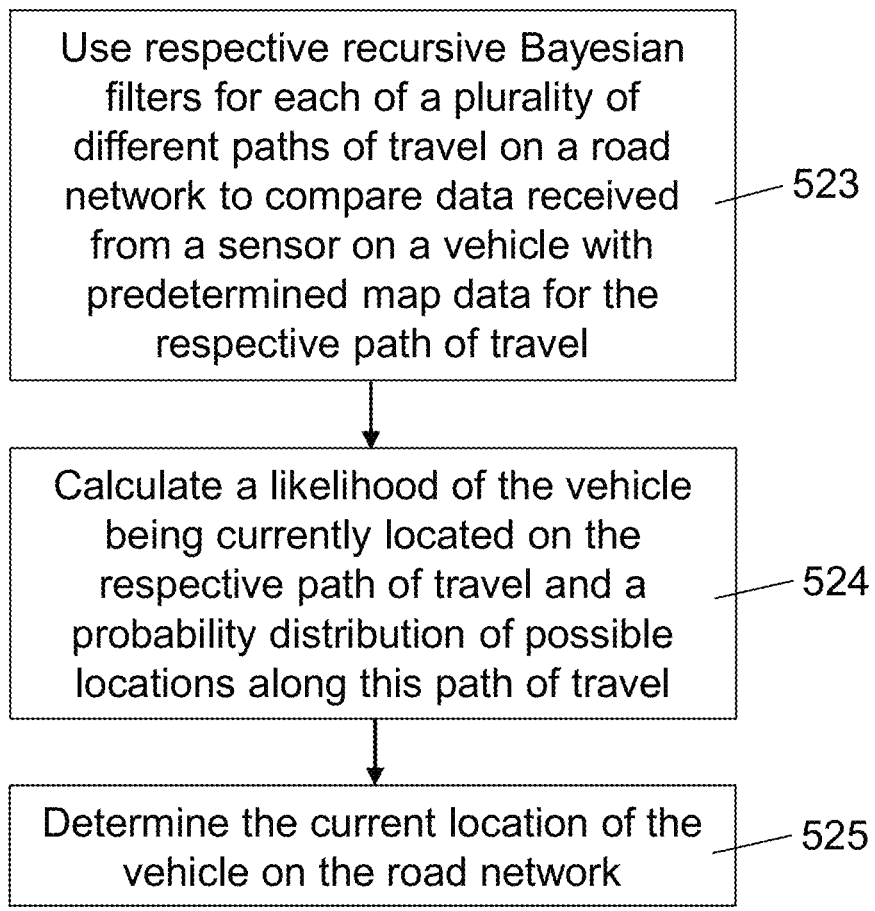
FIG. 5 illustrates schematically the main steps of a method described herein.

FIG. 5 shows the main steps 523-525 of the method described herein. The method generally comprises: using respective recursive Bayesian filters for each of a plurality of different paths of travel on a road network to compare data received from a sensor on a vehicle with predetermined map data for the respective path of travel 523; calculating a likelihood of the vehicle being currently located on the respective path of travel and a probability distribution of possible locations along this path of travel 524; and determining the current location of the vehicle on the road network 525.

Figure 6:
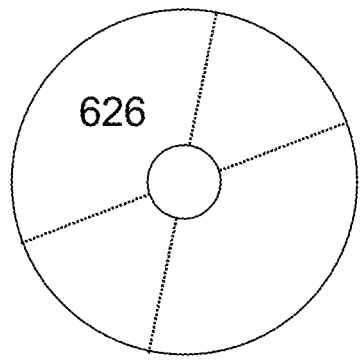
FIG. 6 shows a computer-readable medium comprising a computer program configured to perform, control or enable one or more methods described herein.

FIG. 6 shows a computer/processor readable medium 626 providing a computer program according to one embodiment. The computer program may comprise computer code configured to perform, control or enable one or more of the method steps 523-525 of FIG. 5. In this example, the computer/processor readable medium 626 is a disc such as a digital versatile disc (DVD) or a compact disc (CD). In other embodiments, the computer/processor readable medium 626 may be any medium that has been programmed in such a way as to carry out an inventive function. The computer/processor readable medium 626 may be a fixed or removable memory device such as a hard drive, solid-state drive, memory stick (e.g. USB memory stick) or memory card (e.g. compact flash, SD, mini SD, micro SD or nano SD). The computer code may be installed at the factory where the apparatus (e.g. portable or in-vehicle satellite navigation device), or vehicle comprising the apparatus, is being assembled. Later updates to the system may be made via the computer/processor readable medium 626 mentioned above.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device and/or other features of particular mentioned apparatus/device may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/ processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/ position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
a processor and memory including computer program code, the memory and computer program code configured to, with the processor, enable the apparatus at least to:
determine a plurality of different paths of travel for a vehicle on a road network by map-matching at least one known location of the vehicle with predetermined map data for the road network, each of the plurality of paths of travel comprising a driveable sequence of contiguous road segments in two or three dimensions reflecting the trajectory of the vehicle so far;
determine a current location of the vehicle on the road network using respective recursive Bayesian filters for each of the different paths of travel, each recursive Bayesian filter configured to compare data received from a sensor on the vehicle with predetermined map data for the respective path of travel to calculate a likelihood of the vehicle being currently located on the respective path of travel and a probability distribution of possible locations along this path of travel, and
determine one or more additional paths of travel in the event that the likelihoods associated with each of the different paths of travel are below a predefined threshold.

2. The apparatus of claim 1, wherein the apparatus is configured to extend a path of travel based on the predetermined map data when the current location of the vehicle is determined to be proximal to the end of the path of travel.

3. The apparatus of claim 1, wherein the apparatus is configured to determine the current location of the vehicle at least partially by:
excluding any paths of travel having an associated likelihood below a predefined threshold;
excluding any path of travel in which the ratio of its associated likelihood to that of the most likely path of travel is below a predefined threshold; or
excluding all but a predefined number of paths of travel having the highest associated likelihoods whilst retaining any paths of travel having an associated likelihood equal to the lowest of the remaining paths of travel.

4. The apparatus of claim 1, wherein the apparatus is configured to determine the current location of the vehicle as one or more of the possible locations along the path of travel having the greatest associated likelihood.

5. The apparatus of claim 4, wherein each recursive Bayesian filter is a Kalman filter configured to produce a Gaussian distribution of possible locations along the respective path of travel, and
wherein the apparatus is configured to determine the current location of the vehicle as the centre of the Gaussian distribution associated with the path of travel having the greatest associated likelihood.

6. The apparatus of claim 1, wherein the apparatus is configured to normalize the likelihoods calculated by the recursive Bayesian filters to obtain a probability distribution of the possible paths of travel.

7. The apparatus of claim 1, wherein each recursive Bayesian filter is configured to compare the sensor and predetermined map data to include one or more additional physical state variables in the probability distribution.

8. The apparatus of claim 7, wherein the one or more additional physical state variables comprise at least one of speed, heading, angular velocity, odometer scaling factor and gyroscope calibration parameters.

9. The apparatus of claim 8, wherein the paths of travel are unidirectional, and wherein the apparatus is configured to, in the event that the heading of the vehicle differs by more than 90° relative to a direction of travel associated with one of these paths of travel, add an identical path of travel extending in the opposite direction.

10. The apparatus of claim 1, wherein each recursive Bayesian filter is configured to compare real-time sensor data with the predetermined map data.

11. The apparatus of claim 1, wherein the apparatus is configured to store the sensor data after it has been received, and each recursive Bayesian filter is configured to compare the stored sensor data with the predetermined map data.

12. The apparatus of claim 1, wherein the plurality of different paths of travel comprise two or more paths of travel which intersect at a common point on the road network.

13. A computer-implemented method comprising:
    determining a plurality of different paths of travel for a vehicle on a road network by map-matching at least one known location of the vehicle with predetermined map data for the road network, each of the plurality of paths of travel comprising a driveable sequence of contiguous road segments in two or three dimensions reflecting the trajectory of the vehicle so far;
    determining a current location of the vehicle on the road network using respective recursive Bayesian filters for each of the different paths of travel, each recursive Bayesian filter configured to compare data received from a sensor on the vehicle with predetermined map data for the respective path of travel to calculate a likelihood of the vehicle being currently located on the respective path of travel and a probability distribution of possible locations along this path of travel; and
    determining one or more additional paths of travel in the event that the likelihoods associated with each of the different paths of travel are below a predefined threshold.

14. A non-transitory computer-readable storage medium for labeling images for cross view alignment, carrying one or more sequences of one or more instructions which, when executed by one or more processors, cause an apparatus to perform:
    determining a plurality of different paths of travel for a vehicle on a road network by map-matching at least one known location of the vehicle with predetermined map data for the road network, each of the plurality of paths of travel comprising a driveable sequence of contiguous road segments in two or three dimensions reflecting the trajectory of the vehicle so far;
    determining a current location of the vehicle on the road network using respective recursive Bayesian filters for each of the different paths of travel, each recursive Bayesian filter configured to compare data received from a sensor on the vehicle with predetermined map data for the respective path of travel to calculate a likelihood of the vehicle being currently located on the respective path of travel and a probability distribution of possible locations along this path of travel; and
    determining one or more additional paths of travel in the event that the likelihoods associated with each of the different paths of travel are below a predefined threshold.

15. The computer-implemented method of claim 13, further comprising:
    extending a path of travel based on the predetermined map data when the current location of the vehicle is determined to be proximal to the end of the path of travel.

16. The computer-implemented method of claim 13, wherein the current location of the vehicle at least partially determined by:
    excluding any paths of travel having an associated likelihood below a predefined threshold;
    excluding any path of travel in which the ratio of its associated likelihood to that of the most likely path of travel is below a predefined threshold; or
    excluding all but a predefined number of paths of travel having the highest associated likelihoods whilst retaining any paths of travel having an associated likelihood equal to the lowest of the remaining paths of travel.

17. The computer-implemented method of claim 13, further comprising:
    determining the current location of the vehicle as one or more of the possible locations along the path of travel having the greatest associated likelihood.

18. The computer-implemented method of claim 13, wherein each recursive Bayesian filter is configured to compare the sensor and predetermined map data to include one or more additional physical state variables in the probability distribution.

19. The computer-implemented method of claim 18, wherein the one or more additional physical state variables comprise at least one of speed, heading, angular velocity, odometer scaling factor and gyroscope calibration parameters.

20. The computer-implemented method of claim 13, wherein each recursive Bayesian filter is configured to compare real-time sensor data with the predetermined map data.

* * * * *